Figure 1:
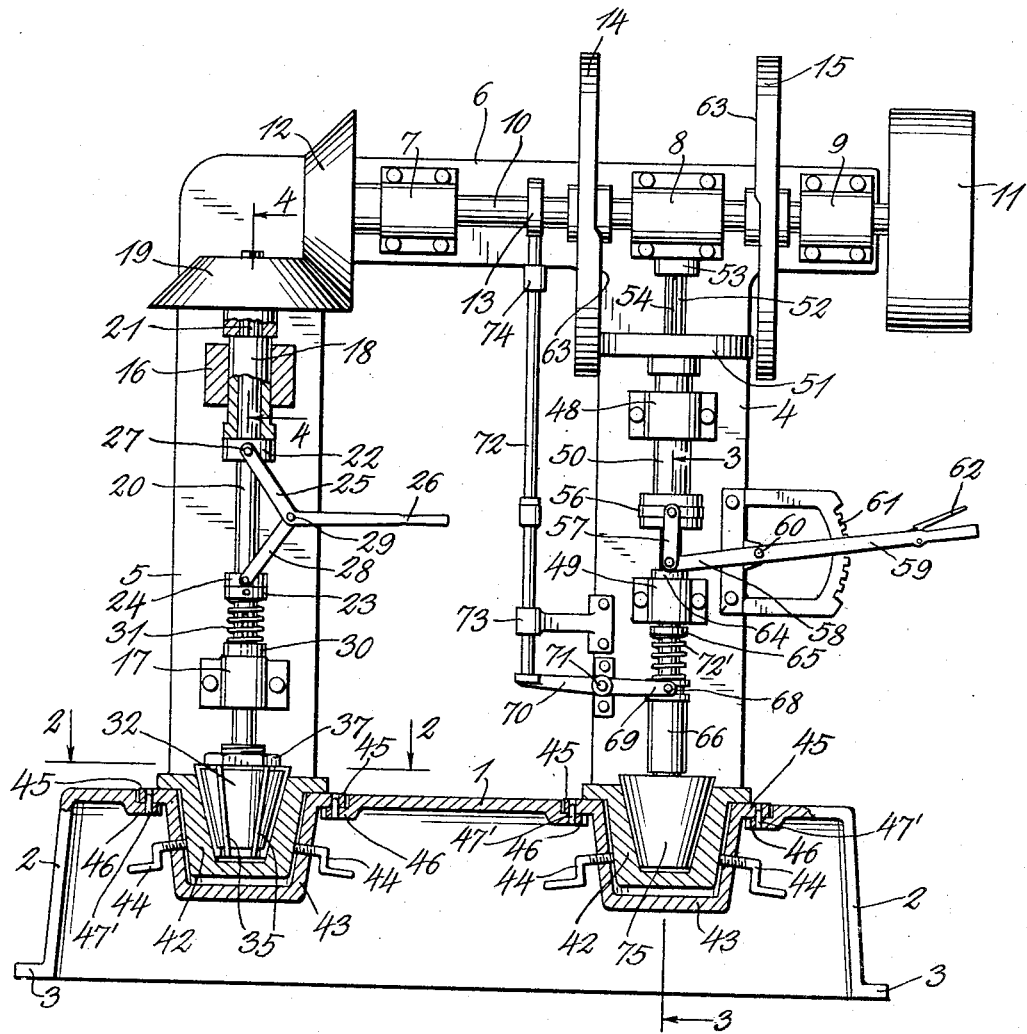

Jan. 10, 1933.  H. R. ROGERS  1,893,637
FRICTION TAPER VALVE CUTTER AND FINISHER
Filed May 19, 1931   2 Sheets-Sheet 1

Inventor
Harry R. Rogers.
By A. J. O'Brien
Attorney

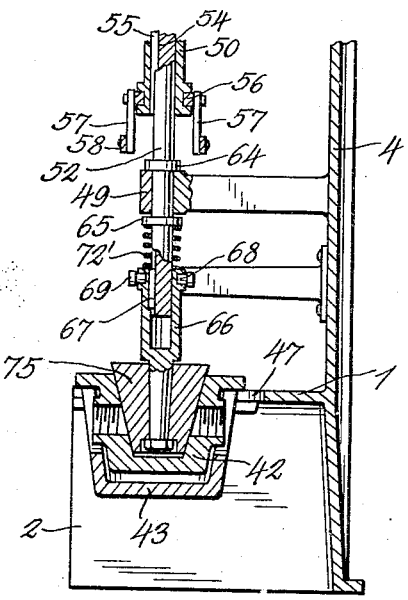
Fig.3.
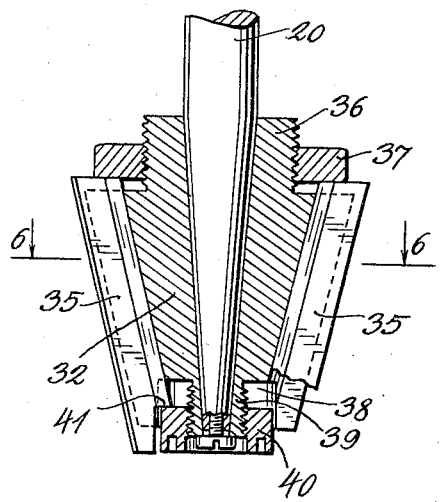
Fig.5.
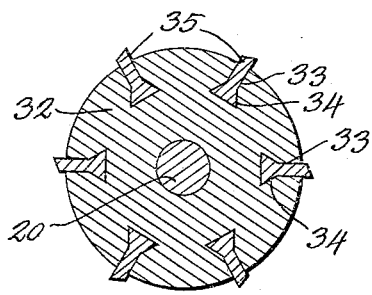
Fig.6.
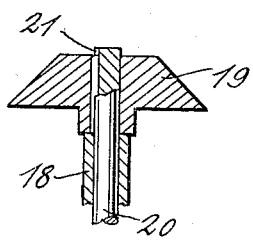
Fig.4.

Patented Jan. 10, 1933

1,893,637

UNITED STATES PATENT OFFICE

HARRY R. ROGERS, OF DENVER, COLORADO

FRICTION TAPER VALVE CUTTER AND FINISHER

Application filed May 19, 1931. Serial No. 538,465.

This invention relates to improvements in machines for reconditioning and resurfacing high pressure valves of the type employed in connection with gas and oil pipe lines.

Where oil and gas under high pressures are to be controlled a special type of valve has been found to be necessary because the ordinary globe valves have proven ineffectual and unsuited for this purpose.

The valve that has been adopted for this purpose consists of a housing or valve body having a frusto-conical opening into which a similarly shaped plug or core is forced when the valve is to be closed. Due to the high pressures and to the fact that the oil and gas often contain chemicals that exert a corroding effect on the metal, it has been found that the surfaces of the valve will soon become corroded to such an extent that the valve will not close tightly and when this occurs the valve must either be replaced by a new one or else the walls of the valve body as well as the surface of the core must be resurfaced and reground in order to secure the necessary fit for successful operation.

It is the object of this invention to produce a machine of a simple and substantial construction that shall be so designed that by its use the valve members can be readily reconditioned so as to fit them for further use and in this way instead of incurring the expense of new parts, the old parts can be put in such shape that they can be successfully used for a longer period of time and in this way a large saving can be effected.

This invention, briefly described, consists of a frame having a supporting base and having a drive shaft rotatably connected therewith. One end of the drive shaft is provided with a bevel gear of the friction type which is adapted to cooperate with a similar gear carried on the upper end of another shaft that is mounted for rotation about a vertical axis. The lower end of the second shaft is so constructed that a reamer can be connected with it and this reamer is placed within the opening in the valve body so that when the parts are rotating the reamer will function to recondition the inner surface of the valve body. Means is also provided for exerting pressure on the reamer and on the friction gear. In addition to the reamer the machine is also provided with another vertical shaft to which a core can be attached and which is connected with the drive shaft by mechanisms which produce alternate rotation in opposite directions and at the same time raises the core so that the surfaces can be ground by means of a grinding compound.

Figure 2:
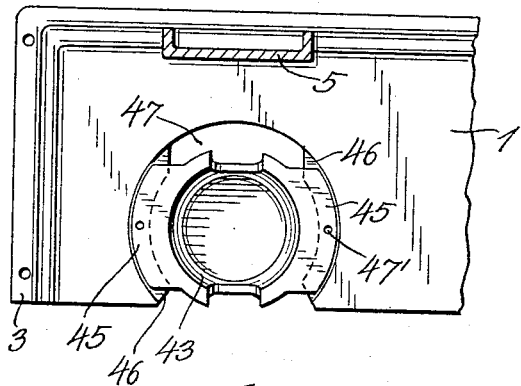

Having thus briefly described the invention, the same will now be described in detail, and for this purpose reference will be had to the accompanying drawings in which the preferred construction has been illustrated, and in which:

Fig. 1 is a view partly in elevation and partly in section showing the front side of the machine;

Fig. 2 is a section taken on line 2—2, Fig. 1;
Fig. 3 is a section taken on line 3—3, Fig. 1;
Fig. 4 is a section taken on line 4—4, Fig. 1;
Fig. 5 is a longitudinal diametrical section through the reamer; and
Fig. 6 is a transverse section taken on lines 6—6, Fig. 5.

In the drawings reference numeral 1 represents the upper surface of the base which has been shown as provided with downwardly extending end walls 2 that terminate in outwardly projecting flanges 3. This base may be secured to a bench or to any other suitable supporting surface. Extending upwardly from the base is a frame having two spaced vertical members 4 and 5 that are preferably channel shape. The upper frame member has been designated by reference numeral 6. The frame including the base and the members 4, 5 and 6 may be cast integral, or they may be made up of several pieces welded or otherwise secured together. Carried by the frame member 6 are bearings 7, 8 and 9 in which the drive shaft 10 is rotatably mounted. Secured to one end of the drive shaft is the pulley 11 to which the belt from the motor or engine is connected. The other end of the drive shaft is provided with a bevel friction gear 12. Shaft 10 is also provided with a cam 13 and two spaced friction disks 14 and 15, to which reference will be made hereinafter. The frame member 5 is provided with two bearings 16 and 17. In the bearing 16 a tubular shaft 18 is mounted for rotation. Resting on the upper end of the tubular shaft is a bevel gear 19 of the friction type. A shaft 20 extends through the tubular bearing 18 and has a splined connection with gear 19. The groove with which the key operates has been designated by reference numeral 21. Slidably connected with shaft 20 is a collar 22 on which the lower end of tubular member 18 rests. The upper end of member 18 serves as a support for the gear 19 and therefore if member 18 is moved upwardly it will force the two friction surfaces of gears 12 and 19 into contact with each other. Secured to shaft 20 is another collar 23 that serves as an abutment for a collar 24 that is rotatably connected with the shaft. A bent lever having two angularly related arms 25 and 26 has one end pivoted to the collar 22 as indicated by 27 and a link 28 has one end pivoted to the collar 24 and the other pivoted at the juncture of parts 25 and 26, as shown by reference numeral 29. It is apparent that parts 25 and 28 form a toggle and that by moving the handle 26 downwardly, it tends to increase the distance between collars 22 and 24. Another collar that has been designated by reference numeral 30 is slidably but nonrotatably connected with the shaft and this serves as an abutment for the lower end of spring 31 whose upper end abuts the under surface of collar 23. The action of the spring is to raise shaft 20. Secured to the lower end of shaft 20 is a reamer. This reamer has been shown in section in Figs. 5 and 6 and consists of a frusto-conical body portion 32 that is provided with six longitudinally extending slots 33. The bottoms of these slots are inwardly and downwardly inclined with respect to the axis and are preferably dovetail in shape, as indicated at 34. Cutter blades 35 are mounted in the slots and project outwardly a short distance beyond the outer surface of member 32. The upper end of member 32 is provided with a threaded extension 36 on which a nut 37 is mounted. The lower end of member 32 has an annular groove 38 and a central threaded plug 39. A nut 40 is connected with the threaded plug 39 and abuts the edges 41 on the lower ends of the cutter blades. From Fig. 5 it will be seen that the cutter blades are securely held against longitudinal movement by the nuts 37 and 40. By loosening nut 37 and then tightening nut 40, the blades can be moved upwardly and therefore the diameter at any predetermined point of the blades will be increased. By loosening nut 40 and tightening nut 37, the blades will be moved downwardly and the diameter at any predetermined point on the blades will be decreased. The reamer that has just been described can therefore be adjusted within certain limits so as to adapt it for use with valves of different sizes.

The valve member that is to be repaired has been designated by reference numeral 42 and in Fig. 1 it has been shown as seated in a holder 43. This holder has a depression or cavity of the right size and shape to receive the valve member and is also provided with set screws 44 for holding the valve member against rotation and for preventing it from moving relative to the holder. In the drawings the holder has been shown as provided with two diametrical flanges 45 that are adapted to rest on inwardly projecting ledges 46. The base has openings 47 through which the extensions 45 can be moved when the holders are disconnected. Dowel pins 47' are provided for holding the parts against rotation when the machine is operating.

Assuming that the parts are assembled as shown in Fig. 1 and that shaft 20 is rotating, it is evident that the cutter 32 will also rotate and when pressure is exerted on the handle 26 the friction gears will be moved into operative position, thereby causing shaft 20 to rotate. When pressure is exerted on the gear 19, a corresponding force will also be imparted to the cutter 32 tending to force the latter into the valve member. Since gears 12 and 19 are friction gears, it is evident that if the cutter should become stuck for some reason, the parts will not break as the friction gears will slide. The friction gears have been provided for the purpose of giving safety to the operation, but so far as the function of rotating shaft 20 is concerned, they can be replaced by ordinary gears.

After the inner surface of the valve member has been cut down by means of the rotating reamer, it is then transferred to the finishing machine where the surface is ground so as to give it a high finish. This finishing machine will now be described.

Secured to the frame member 4 are bearings 48 and 49. Rotatably mounted in bearing 48 is a tubular shaft 50 to the upper end of which a friction disk 51 is connected. A shaft 52 extends through the tubular shaft 50 and has its upper end journalled in bearing 53. Shaft 52 is provided with a key slot 54 in which a key 55 is located. Key 55 provides a connection between shafts 50 and 52 that permits longitudinal movement but prevents relative rotary movement. The lower end of tubular shaft 50 is provided with a circumferential groove in which ring 56 is located. Secured to opposite points of the ring are two connecting rods 57 whose lower ends are connected with the two forked end members 58 of the handle 59. This handle is pivoted at 60 and cooperates with a quadrant having teeth 61. Means is provided for latching handle 59 to the quadrant by means of a plunger or pawl operated by the lever 62.

By moving lever 59 the position of the friction disk 51 can be moved upwardly or downwardly so as to vary the speed at which shaft 52 oscillates. Friction disks 14 and 15 are secured to shaft 10 and are provided with friction surfaces 63. These surfaces are so located with respect to the center of shaft 54 that they contact with the outer surface of disk 51 and since surfaces 63 are located on opposite sides of a diametrical plane, only one of them will contact with disk 51 at the same time, and it is therefore apparent that when shaft 10 is turned in one direction, shaft 52 will be rotated alternately in opposite direction. Shaft 52 is provided with a collar 64 that serves as a stop and prevents the shaft from moving downwardly. Another collar 65 is located beneath bearing 49 as shown in Fig. 3. The lower end of shaft 52 is provided with a keyway and carries a tubular extension 66 which is connected with it by means of a key 67. The upper end of member 66 has a groove extending circumferentially around it and pins 68 that are carried by the two-forked ends 69 of the lever 70 engage in this groove. Lever 70 is pivoted intermediate its ends as indicated by reference character 71. A spring 72' is located between the collar 65 and the upper end of member 66 and tends to move the latter downwardly. A pushrod 72 is slidably mounted in bearings 73 and 74 and has its upper end in contact with the cam 13. As shaft 10 rotates, lever 70 will be rocked about its pivot and will move member 66 up and down in a manner quite apparent. Secured to the lower end of member 66 is a core 75. This core has a smooth surface and is of the proper size to fit the valve member 42. Some abrading compound, such as carborundum paste is applied to the surfaces and the machine operated whereby the oscillation of the core together with its reciprocation will give the surface of the valve member a fine finish so that when the valve is put into operation, it will make a perfect fit.

It will be seen from the above description that the machine which forms the subject of this invention is of simple and substantial construction and so designed that one valve can be ground and the other finished at the same time and in this way the machine will have a large capacity. By the simple operation outlined above, valve members that have heretofore been discarded and replaced by others at a high cost, can be reconditioned so that they can be used for another period of time, thereby effecting a large saving to companies that employ a large number of valves.

When reference is made in the foregoing, to "a friction gear" it is to be understood that this is merely an example of a friction drive and that any equivalent means can be substituted that will yield and prevent breakage if the reamer gets stuck.

Having described the invention what is claimed as new is:

1. A machine for grinding and polishing, comprising, in combination, a frame, a drive shaft carried by the frame and mounted for rotation, two friction gear disks mounted on the drive shaft in spaced relation, the adjacent surfaces of the disks being each composed of two substantially circular portions each lying in a separate plane which is perpendicular to the axis of the drive shaft, whereby each disk has a raised surface and a depressed surface, the raised surface of one disk lying opposite the depressed surface of the other disk, the raised surfaces being the driving surfaces, a driven shaft carried by the frame and mounted for rotation about an axis substantially perpendicular to the axis of the drive shaft, the driven shaft being located between the spaced disks, a friction gear wheel carried by the end of the driven shaft the size of the gear wheel being such that it will contact with the nearest surface of the friction disks whereby when the drive shaft rotates the friction gear wheel will be engaged alternately on opposite sides and rotated alternately in opposite directions, a tool carried by the other end of the second shaft, a spring urging the tool outwardly along the shaft and means operated from the drive shaft for reciprocating the tool against the action of the spring.

2. A machine for grinding and polishing, comprising, in combination, a frame, a drive shaft carried by the frame and mounted for rotation, two friction gear disks mounted on the drive shaft in spaced relation, the adjacent surfaces of the disks being each composed of two substantially circular portions each lying in a separate plane which is perpendicular to the axis of the drive shaft, whereby each disk has a raised surface and a depressed surface, the raised surface of one disk lying opposite the depressed surface of the other disk, the raised surfaces being the driving surfaces, a driven shaft carried by the frame and mounted for rotation about an axis substantially perpendicular to the axis of the drive shaft, the driven shaft being located between the spaced disks, a friction gear wheel carried by the end of the driven shaft, the size of the gear wheel being such that it will contact with the nearest surface of the friction disks whereby when the driven shaft rotates the friction gear wheel will be engaged alternately on opposite sides and rotated alternately in opposite directions, a tool carried by the other end of the driven shaft, a spring urging the tool outwardly along the shaft, means for moving the friction gear wheel in the direction of the axis of the driven shaft whereby the speed of rotation of this shaft can be varied and means operated by the drive shaft for intermittently moving the tool against the tension of the spring when the parts are operating so that the reciprocations of the tool are in cooperative relation to the tool drive.

In testimony whereof I affix my signature.

HARRY R. ROGERS.